July 1, 1958        J. A. HUMBLE        2,841,354

NON-ROTATIONAL SHOCK AND VIBRATION ABSORBERS

Filed Nov. 23, 1954        2 Sheets-Sheet 1

INVENTOR.
JOHN A. HUMBLE
ATTYS.

INVENTOR.
JOHN A. HUMBLE

United States Patent Office 2,841,354
Patented July 1, 1958

2,841,354

NON-ROTATIONAL SHOCK AND VIBRATION ABSORBERS

John A. Humble, Indianapolis, Ind., assignor to the United States of America as represented by the Secretary of the Navy Application November 23, 1954, Serial No. 470,841

2 Claims. (Cl. 248—358)

(Granted under Title 35, U. S. Code (1952), sec. 266)

The invention described herein may be manufactured and used by or for the Government of the United States of America for governmental purposes without the payment of any royalties thereon or therefor.

This invention relates to a shock and vibration absorber and more particularly to an absorber for mounting a precision instrument, such as a gyroscope, in a resilient manner, such that the instrument will not rotate about any axis. The invention disclosed herein is similar to an invention made of Kenneth E. Goode, entitled, "Shock and Vibration Mount Having Non-rotational Features," described in United States application No. 460,785, filed October 6, 1954, now Patent No. 2,809,005, however the present invention incorporates improvements therein by using fluid dampening means, nylon bearings for guiding linear motion, and tube form mountings for vibration isolation.

Precision instruments that are mounted in aircrafts and naval ships are subjected to various types of damaging forces. One type of damaging force is that of vibration which can be caused by an unbalanced force, such as a rotating mass. This type of damaging force is often applied over long periods of time and if not minimized will cause failure due to fatiguing of parts. Another type of damaging force is that of shock which, for example, can be caused by an aircraft making a landing or by the reaction due to the firing of a projectile. Shocks usually are of large magnitude and if not minimized will cause fracture or breakage of sensitive components in precision instruments.

Normally the same absorber is employed to protect an instrument from both vibration and shock. However, there is an inherent disadvantage to this method of isolation because shocks are often of large magnitude, and if the absorbing means are designed to give complete shock protection then vibration dampening will be insufficient and failure in an instrument will result due to fatigue. On the other hand, if the resilient absorbing means are designed to give full vibration protection, there will be insufficient dampening of large shocks and failure will be due to breakage of fragile elements. Heretofore most available types of absorbers are designed for a median condition and only provide for partial protection of vibration and shock.

The invention described herein eliminates the disadvantages of heretofore available absorbers and provides for complete protection against both vibration and shock. The present invention employs tube form mountings for vibration isolation, which allow the resilient members, composed of rubber elements bonded to steel elements, to be stressed in shear. A shear stressed rubber mounting provides for a soft suspension and yet provides for stability in directions normal to the major thrusts. The resilient members which are used in the embodiment shown in the present invention are designed to give full vibration protection. Additional novel fluid dampening means are employed to give protection against damaging shocks. Columns of air are provided above the resilient tube form mountings, and small orifices control the rate of air discharge. The size of the orifices are of sufficient magnitude to allow full vibration isolation, yet are small enough to restrict discharge of air when a shock is applied. Thus, when a damaging shock is applied to the absorber, an additional air cushion is employed for dampening.

Although the combination of the resilient members and the novel fluid dampening means can be employed in many types of absorbers, one particular use can be in an absorber designed for mounting a gyroscope. A gyroscope can be used to measure the degree of rotation between one of its own axes and an axis of an aircraft, and when so employed any rotation of a gyroscope due to the rocking of an absorber will introduce an error into the gyroscope's output data.

One method of eliminating rotation due to the rocking of an instrument on its resilient members is to provide for motion control means that allow the absorber to translate only in three mutually perpendicular planes. One of the better known methods for obtaining linear motion is to have shafts, which are closely fitted through bushings, guide the translating members. Heretofore shafts were fitted through either metal bushings or ball bushings, but either method had certain inherent disadvantages. If metal bushings are employed, a lubrication problem is involved due to the close fitting of the shafts and also extreme shocks may distort the metal bushings. The use of ball bushings as a guiding means has a disadvantage in that the oscillatory motion is often so small that the balls in the bushings do not revolve and thus the same surfaces are continually in use and flat portions will develop thereon.

The present invention shows the use of polyamide resinous material such as nylon as a bearing material to be used in conjunction with the novel fluid dampening means and the tube form mounting means. The use of nylon eliminates the need of lubrication since there is relatively low heat generation. Also nylon is a resilient material and capable of taking great stresses without resulting in permanent distortion.

It is therefore a general object of this invention to provide an absorber that will give full protection against both vibration and shock and in particular to provide an improved shock and vibration absorber for use in mounting precision instruments, such as gyroscopes. Other objects and many attendant advantages of this invention will be readily appreciated as the same becomes better understood by reference to the following detailed description when considered with the accompanying drawings in which.

Figure 1:
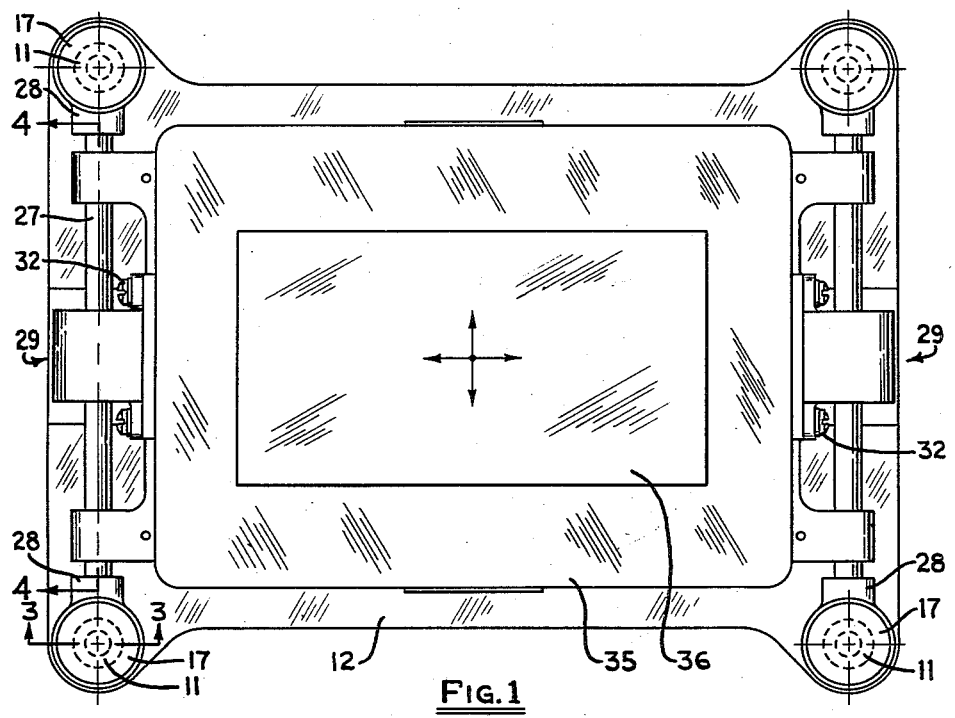
Fig. 1 is a top plan view showing the complete invention.
Figure 2:
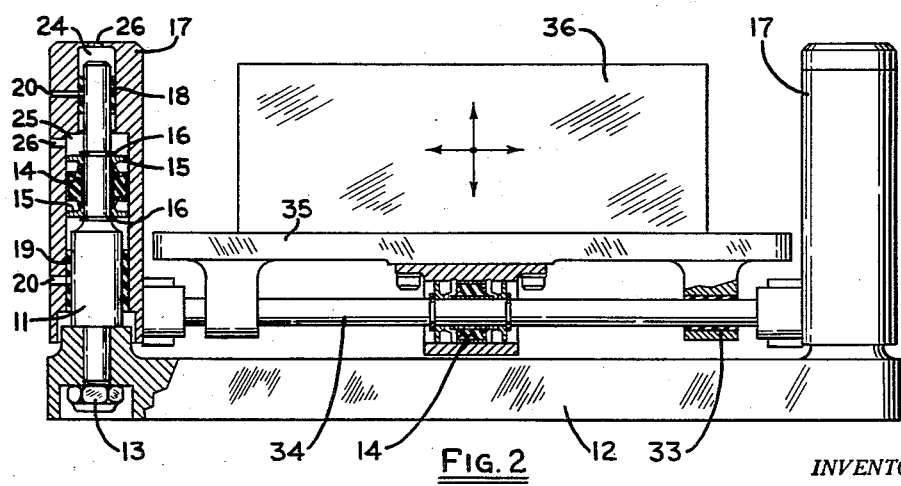
Fig. 2 is a side view partially broken away and partially in section, showing the dampening elements.
Figure 3:
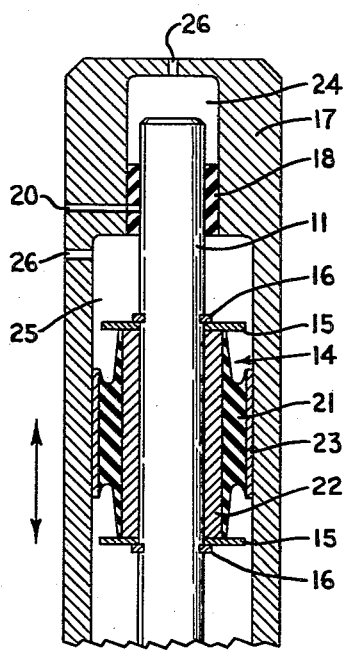
Fig. 3 is an enlarged partial sectional view taken on line 3—3 of Fig. 1 and shows the fluid dampening means.

Referring now to the drawings wherein like reference characters designate like or corresponding parts throughout the several views, there is shown in Figs. 1 and 2 that four shafts 11 are mounted perpendicular to a base 12 and secured thereto by means of nuts 13. Figs 2 and 3 of the drawings show tube form mountings 14, such as those described in bulletin No. 104 of the Lord Manufacturing Company, Erie, Pennsylvania, disposed about each shaft 11 and maintained in position by snubbing washers 15 and retaining rings 16. Vertical tubes 17 are press fitted on the outside diameter of the tube form mountings 14 and nylon bearings 18 and 19 are secured to the vertical tubes 17 by pins 20. The nylon bearings 18 and 19 have inside diameters that are only slightly larger than the outside diameters of the shafts 11 and these bearings restrict translation to a direction that is perpendicular to the base 12. In addition to guiding the vertical tubes 17 in a direction normal to the base 12, the nylon bearings 18 and 19 serve as additional dampening means since any motion of the nylon bearings 18 and 19 relative to the shaft 11, will introduce friction which will aid in dampening vibration.

Referring now to Fig. 3, the tube form mounting 14 is shown to consist of a rubber element 21 bonded to an inner sleeve 22 and an outer sleeve 23. The outer sleeve 23 is press fitted into the bore of the vertical tube 17 and the inner sleeve 22 is close fitted about the shaft 11 and secured in position by means of snubbing washers 15 and retaining rings 16. When the vertical tube 17 moves relative to the shaft 11, it can be seen that the outer sleeve 23 will move relative to the inner sleeve 22, which remains stationary, and thus a shearing action takes place in the rubber element 21. This shearing action in the rubber element 21 provides for necessary vibration isolation needed to protect precision instruments, the shear stressed rubber providing a soft suspension, yet allowing stability in the other modes of travel.

Referring still to Fig. 3, it can be seen that there is an air chamber 24 located above the nylon bearing 18 and a second air chamber 25 located below the nylon bearing 18. In operation, when the vertical tube 17 is undergoing small oscillatory motion, the two orifices 26, which are of relatively small magnitude, will allow complete release of air and no additional dampening will take place. However, when a large shock is imparted to the vertical tube 17, large movement occurs and the air in the two chambers 24 and 25 will be compressed, and since the orifices 26 are of sufficiently small magnitude there will be a restricted flow of air thus bringing into effect a fluid dampening means.

The size of the orifices 26 depends upon a number of variables such as the inside diameter of the air chambers 24 and 25, the diameter of the shaft 11 and the weight of the load which is to be carried by the absorber. In a prototype model of a shock and vibration absorber similar to one described herein, the orifice 26 had a diameter of 3/32 inch and the inside diameter of the air chamber 24 was approximately 7/16 inch, which gave a ratio of the diameter of orifice to diameter of air chamber of approximately .214. A twenty-five pound load was mounted on the prototype mount and satisfactory vibration isolation was observed over a frequency range of 0 to 500 cycles per second, with an applied force of $10g$ ($1g = .0511Df^2$ where $D$ is total excursion and $f$ is frequency in cycles per second).

Figure 4:
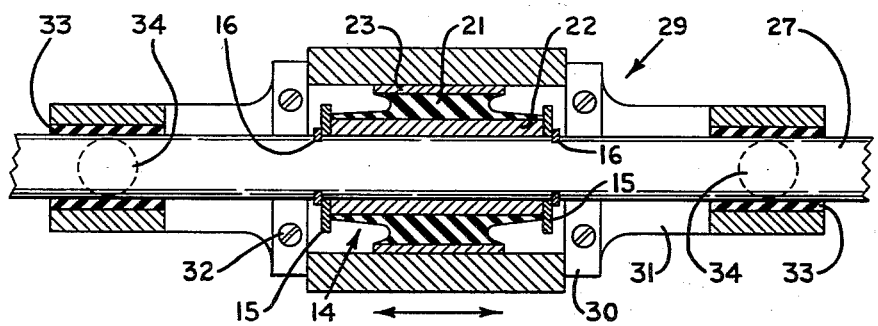
Fig. 4 is an enlarged partial sectional view taken on line 4—4 of Fig. 1, showing tube form mountings and nylon bushings.

Referring again to Figs. 1 and 2 of the drawings, there is shown two parallel shafts 27 which are in a plane parallel to base 12, fitted into boss portions 28 of the four vertical tubes 17. Referring now to Figs. 1 and 4 it can be seen that each shaft 27 carries a carriage member, which is designated generally by reference numeral 29. The carriage member 29, as shown in Fig. 4 is assembled from two main parts, it being understood that other methods of assembly are equally adaptable and that the method shown is by way of example only and not intended as any limitation on this invention. As illustrated in Fig. 4, a tube mounting member 30 is fastened to the bearing member 31 by means of four screws 32. A tube form mounting, which is designated generally by reference numeral 14 and which is composed of a rubber element 21 bonded between an inner sleeve 22 and an outer sleeve 23, has its outer sleeve 23 press fitted into the tube mounting member 30, the inner sleeve 22 being closely fitted and disposed about the shaft 27. Snubbing washers 15 and retaining rings 16 secure the inner sleeve 22 to the shaft 27 and it can readily be seen that any movement of the carriage member 29 will cause the outer sleeve 23 to move relative to the inner sleeve 22, causing a shearing action in the rubber element 21. The shearing action of the rubber element 21 provides for necessary vibration isolation needed to protect precision instruments, the shear stressed rubber providing a soft suspension, yet allowing stability in the other modes of travel.

The bearing member 31, which is part of the carriage member 29 is provided with nylon bearings 33 that have inside diameters that are only slightly larger than the outside diameter of the shaft 27. The nylon bearings 33 restrict the carriage members 29 to a direction of travel which is parallel to the shaft 27 and provide an extremely smooth bearing surface that affords very low friction and eliminates the need of lubrication.

Referring now to Figs. 2 and 4, it can be seen that a second pair of parallel shafts 34, which are parallel to the base 12 and perpendicular to the first pair of parallel shafts 27, are fixed to the two carriage members 29, which constrains the two carriage members 29 so that they move in unison and in effect make them a single element.

A mounting plate 35 is carried on the second pair of parallel shafts 34 in a manner similar to that employed in carrying the carriage members 29 on their shafts 27. It can be seen in Fig. 2 that the vibration isolation is accomplished by a tube form mounting 14 and that nylon bearings 33 are provided to give smooth bearing surfaces. A precision instrument 36, such as a gyroscope can be mounted to the top of the mounting plate 35, and it can readily be seen that the instrument, which is mounted thereon, can translate in any or all of three mutually perpendicular directions and that no rotational effect will be given the instrument.

In operation, the base 12 of the shock and vibration absorber disclosed herein, is fixed to the deck or bulkhead of a ship or aircraft and a precision instrument 36, such as a gyroscope, is fixed rigidly to the top of the mounting plate 35. Any vibration which is transmitted to the base 12 of the absorber will be absorbed by the tube form mountings 14, and if a shock of large magnitude is received the novel fluid dampening means disclosed herein will provide an additional absorber which will help protect the precision instrument 36.

Obviously many modifications and variations of the present invention are possible in the light of the above teaching. For example, in the embodiment shown in the drawings, the novel fluid dampening means were employed to give protection in the vertical direction only. It is obvious that identical fluid dampening means could readily be adapted to give additional protection in either or both horizontal directions. The invention disclosed herein shows an embodiment wherein translation is restricted to three mutually perpendicular directions and it should be understood that there is no intention to so limit this invention to this preferred embodiment, but that the combination of the novel fluid dampening means and the resilient mounting means could be employed in many other types of absorbers wherein rotational motion need not be restricted. Also it is apparent that other fluid means such as the use of various liquids could be employed for dampening of shocks and there is no intention to restrict the present invention to air dampening means alone. It is therefore to be understood that the invention may be practiced otherwise than as specifically described.

What is claimed is:

1. A shock and vibration absorber comprising: a base; a plurality of shafts mounted perpendicular to said base; a plurality of vertical tubes slidably supported one each on each of said shafts, each said vertical tube having at least one fluid chamber therein for dampening movement of said tube; a first pair of parallel shafts rigidly connected to said vertical tubes in a plane parallel to said base; first and second carriage members slidably mounted one each on each of said parallel shafts; a second pair of parallel shafts rigidly connected to said carriage members in a plane parallel to said base and perpendicular to said first pair of parallel shafts; a mounting plate member slidably mounted on said second pair of parallel shafts; and means for resisting movement of said carriage members and said mounting plate member.

2. A shock and vibration absorber as set forth in claim 1 wherein said means for resisting movement of said carriage members and said mounting plate member comprises tube form mountings and first and second abutments on each of said shafts, said tube form mountings comprising a rubber element bonded between inner and outer sleeves, said inner sleeves being disposed about said shafts between said first and second abutments, and said outer sleeves being attached to the respective member that is being resisted in movement.

References Cited in the file of this patent

UNITED STATES PATENTS

| | | |
|---|---|---|
| 1,036,519 | Clallane | Aug. 20, 1912 |
| 1,731,412 | Froesch | Oct. 15, 1929 |
| 2,538,658 | Saurer | Jan. 16, 1951 |

FOREIGN PATENTS

| | | |
|---|---|---|
| 498,043 | Germany | May 17, 1930 |
| 714,386 | Germany | Nov. 28, 1941 |
| 1,047,112 | France | July 15, 1953 |